United States Patent

Tsuchiya

(10) Patent No.: US 10,110,819 B2
(45) Date of Patent: Oct. 23, 2018

(54) IMAGING APPARATUS, AND IMAGE BLUR CORRECTING METHOD OF IMAGING APPARATUS

(71) Applicant: OLYMPUS CORPORATION, Hachioji-shi, Tokyo (JP)

(72) Inventor: Hitoshi Tsuchiya, Hamura (JP)

(73) Assignee: OLYMPUS CORPORATION, Tokyo (JP)

(\*) Notice: Subject to any disclaimer, the term of this patent is extended or adjusted under 35 U.S.C. 154(b) by 0 days.

(21) Appl. No.: 15/278,784

(22) Filed: Sep. 28, 2016

(65) Prior Publication Data

US 2017/0094175 A1   Mar. 30, 2017

(30) Foreign Application Priority Data

Sep. 29, 2015 (JP) ................. 2015-191994

(51) Int. Cl.
    *H04N 5/232*  (2006.01)
    *H04N 5/911*  (2006.01)
    *H04N 5/262*  (2006.01)
    *H04N 5/77*   (2006.01)
    *H04N 5/357*  (2011.01)

(52) U.S. Cl.
    CPC ..... *H04N 5/23287* (2013.01); *H04N 5/23209* (2013.01); *H04N 5/23258* (2013.01); *H04N 5/23296* (2013.01); *H04N 5/2628* (2013.01); *H04N 5/3572* (2013.01); *H04N 5/772* (2013.01); *H04N 5/911* (2013.01)

(58) Field of Classification Search
    CPC ............. H04N 5/23287; H04N 5/772; H04N 5/23296; H04N 5/23293; H04N 5/2628; H04N 5/911; H04N 5/23258; H04N 5/2173; H04N 5/23212

See application file for complete search history.

(56) References Cited

U.S. PATENT DOCUMENTS

| 7,239,342 | B2 * | 7/2007 | Kingetsu | H04N 5/23248 348/208.12 |
| 7,502,052 | B2 * | 3/2009 | Kamoshida | G06T 5/006 348/208.1 |
| 8,134,608 | B2 * | 3/2012 | Yamashita | B60R 1/00 348/148 |
| 8,681,229 | B2 * | 3/2014 | Nomura | G03B 5/00 348/208.1 |
| 8,803,983 | B2 * | 8/2014 | Miyazawa | H04N 5/23287 348/208.11 |

FOREIGN PATENT DOCUMENTS

JP    2014-053720 A    3/2014

\* cited by examiner

*Primary Examiner* — Padma Haliyur
(74) *Attorney, Agent, or Firm* — Volpe and Koenig, P.C.

(57) ABSTRACT

An imaging apparatus according to one embodiment comprises an imaging element, a photographing optical system, a blur detecting section, a blur correcting section, an imaging control section, and a projection converting section. The blur detecting section detects an image moving amount of a subject image. The blur correcting section adjusts a positional relation between the subject image and an imaging plane of the The imaging element on the basis of the image moving amount. The imaging control section acquires an equidistant projection image corresponding to the subject image by the imaging element. The projection converting section converts the equidistant projection image into an image of a different projection system.

16 Claims, 13 Drawing Sheets

Equidistant projection
f·θ

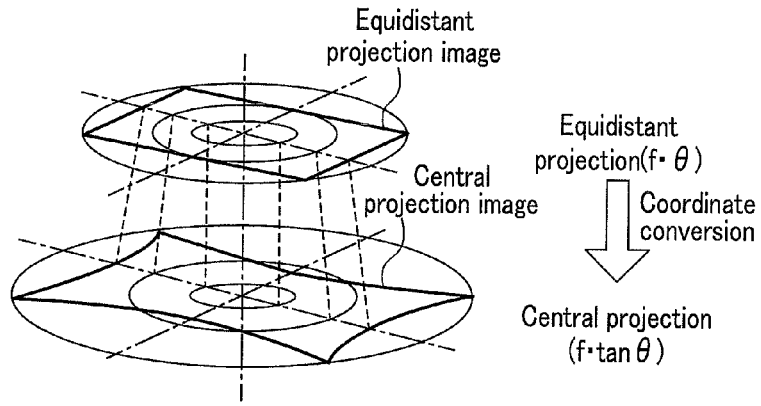
FIG. 5
| Zoom position | Focal distance | Diagonal field angle |
|---|---|---|
| 0 | 13.7mm | 180° |
| 1 | 15mm | 165° |
| 2 | 17mm | 145° |
| 3 | 20mm | 124° |
FIG. 6
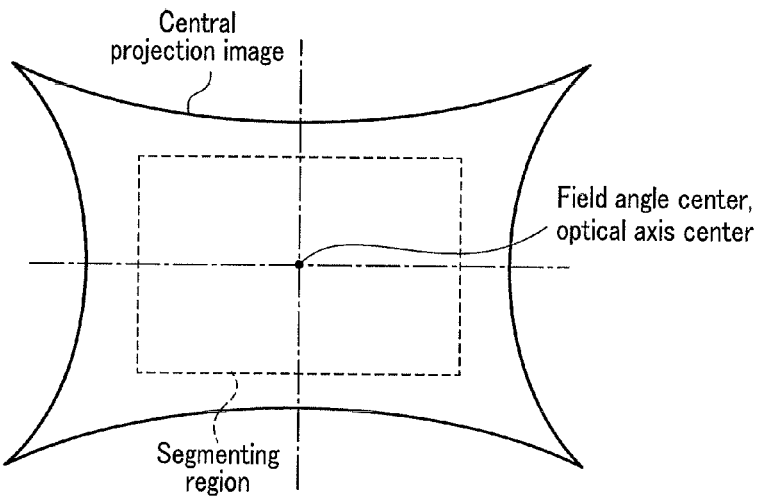
FIG. 7

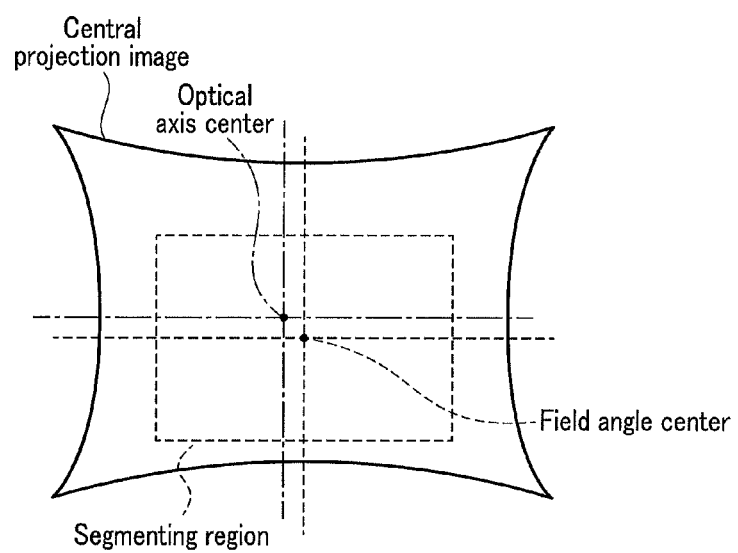
F I G. 13B

IMAGING APPARATUS, AND IMAGE BLUR CORRECTING METHOD OF IMAGING APPARATUS

CROSS-REFERENCE TO RELATED APPLICATIONS

This application is based upon and claims the benefit of priority from the prior Japanese Patent Application No. 2015-191994, filed Sep. 29, 2015, the entire contents of which are incorporated herein by reference.

FIELD

The present invention relates to an imaging apparatus, and an image blur correcting method of the imaging apparatus.

BACKGROUND

There has been used practically an imaging apparatus that detects an amount of blur of a subject image (an image moving amount) on an imaging plane which occurs by accompanying posture change of the imaging apparatus and cancels the detected image moving amount. Such an imaging apparatus performs, for example, optical blur correction to correct a positional relation between the imaging plane and the subject image, electronic blur correction to move an effective region on the imaging plane, or the like, whereby the imaging apparatus corrects the image blur that accompanies the posture change of the imaging apparatus.

For example, Jpn. Pat. Appln. KOKAI Publication No. 2014-053720 discloses an imaging apparatus that performs optical blur correction. Examples of the optical blur correction include systems of lens shift type blur correction to correct image blur by an imaging lens comprising a correction optical system constituted to be movable in an image blur canceling direction, image sensor shift type blur correction to correct the image blur by an imaging element comprising an imaging plane constituted to be movable in a direction perpendicular to an optical axis of the imaging lens, and the like. Furthermore, in the electronic blur correction, the imaging apparatus moves, on the imaging plane, the effective region in which it is possible to acquire the image on the imaging plane to correct the image blur.

SUMMARY

An imaging apparatus according to one embodiment comprises an imaging element, a photographing optical system, a blur detecting section, a blur correcting section, an imaging control section, and a projection converting section. The imaging element comprises an imaging plane in which pixels to convert light into electric signals are arranged. The photographing optical system forms a subject image of equidistant projection on the imaging plane. The blur detecting section detects an image moving amount of the subject image. The blur correcting section adjusts a positional relation between the subject image and the imaging plane on the basis of the image moving amount. The imaging control section acquires an equidistant projection image corresponding to the subject image by the imaging element. The projection converting section converts the equidistant projection image into an image of a different projection system.

According to the present invention, there can be provided an imaging apparatus capable of appropriately performing image blur correction and an image blur correcting method.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 5 is a diagram to explain an example of an operation of converting the equidistant projection system into a central projection system in the imaging apparatus according to the first embodiment;

FIG. 6 is a diagram to explain an example of a relation among a zoom position and a focal distance and a diagonal field angle in the imaging apparatus according to the first embodiment;

FIG. 7 is a diagram to explain an example of cropping in the imaging apparatus according to the first embodiment;

FIG. 13B is a diagram to explain an example of the optical axis center conversion according to the second embodiment;

DETAILED DESCRIPTION

Hereinafter, an imaging apparatus according to one embodiment and an image blur correcting method of the imaging apparatus will be described in detail with reference to the drawings.

First Embodiment

Figure 1:
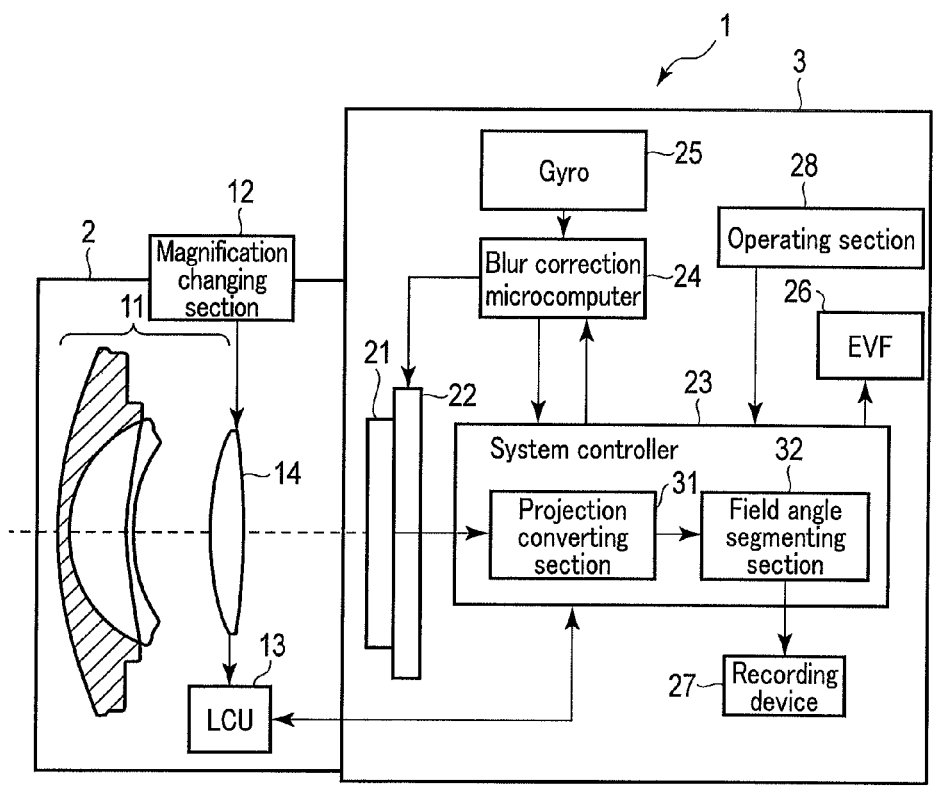
FIG. 1 is a diagram to explain a constitution example of an imaging apparatus according to a first embodiment.

Hereinafter, an example of an imaging apparatus 1 according to a first embodiment will be described with reference to FIG. 1 to FIG. 11. FIG. 1 shows a constitution example of the imaging apparatus 1. The imaging apparatus 1 is a lens interchangeable type camera in which an image blur correction device is mounted. The imaging apparatus 1 comprises an interchangeable lens 2 and a camera body 3.

The interchangeable lens 2 is constituted to be attachable to/detachable from the camera main body 3. In a case of attaching the interchangeable lens 2 to the camera main body 3, the interchangeable lens is connected to the camera main body 3 in a mutually communicable state. Consequently, the interchangeable lens 2 and the camera main body 3 cooperate with each other. The interchangeable lens 2 comprises an optical system 11, a magnification changing section 12, and a lens control unit (LCU) 13.

The optical system 11 is an imaging lens of an equidistant projection system. The optical system 11 forms an image of a light flux from an unshown subject on an imaging plane of an imaging element 21 of the camera main body 3. The optical system 11 comprises, for example, lenses, a aperture that adjusts a quantity of the light flux entering the imaging element 21 via the lens, and a lens (a zoom lens) 14 to change a focal distance of the optical system 11. The optical system 11 moves a position of the zoom lens 14 in an optical axis direction of the optical system 11 to change the focal distance (a field angle) of the optical system 11. Furthermore, the optical system 11 may further comprise a focusing lens to change a focusing position.

The magnification changing section 12 is a mechanism to change the position of the zoom lens 14. The magnification changing section 12 comprises, for example, a zoom ring disposed in an outer periphery of the interchangeable lens 2, and changes the position of the zoom lens 14 in accordance with an operation of the zoom ring, thereby changing the field angle of the optical system 11.

The LCU 13 is, for example, a controller including a CPU, a memory and the like, and controls an operation of the interchangeable lens 2. For example, the LCU 13 controls driving of the lenses and aperture of the optical system 11 in accordance with an instruction from a system controller 23 of the camera main body 3. Furthermore, the LCU 13 may change the field angle of the optical system 11 by changing the position of the zoom lens 14 in accordance with the instruction from the system controller 23.

The LCU 13 holds various pieces of information concerning the interchangeable lens 2 (optical characteristic information) in the memory. The LCU 13 holds, for example, information indicating a model name of the interchangeable lens 2, the focal distance, the number of zoom positions (the number of the positions where the zoom lens 14 is stoppable), a projection system, present setting of the optical system 11 and the like as the optical characteristic information in the memory. The LCU 13 supplies the optical characteristic information stored in the memory to the camera main body 3 in accordance with the instruction from the system controller 23.

The camera main body 3 comprises the imaging element 21, a blur correcting section 22, the system controller 23, a blur correction microcomputer (the microcomputer) 24, a gyrosensor 25, an electronic view finder (EVF) 26, a recording device 27, and an operating section 28.

The imaging element 21 comprises the imaging plane constituted by arranging pixels which photoelectrically convert light to accumulate charges. The imaging element 21 is constituted of, for example, a charge coupled devices (CCD) image sensor, a complementary metal oxide semiconductor (CMOS) image sensor or another imaging element. The imaging element 21 converts the subject image formed on the imaging plane by the optical system 11 into an electric signal (an image signal). The imaging element 21 converts the image signal that is an analog electric signal into image data that is a digital signal to output the data.

The blur correcting section 22 moves the imaging plane of the imaging element 21 in a plane perpendicular to an optical axis of the optical system 11 in accordance with a driving signal generated by the blur correction microcomputer 24, thereby correcting the blur of the subject image on the imaging plane which occurs by accompanying the posture change of the imaging apparatus 1.

The system controller 23 is a controller that includes, for example, the CPU, the memory and the like, and controls an operation of the camera main body 3. For example, the system controller 23 reads the image data obtained by the imaging element 21, and subjects the read image data to various types of image processing required for display or recording. Furthermore, the system controller 23 instructs the LCU 13 of the interchangeable lens 2 to drive the aperture for exposure adjustment or to drive the lens for focus adjustment. Furthermore, the system controller 23 executes control of image display in the EVF 26, control of recording of an image file into the recording device 27, control to switch an operation mode in accordance with an operation of the operating section 28, control of start or end of a photographing operation, and the like.

Furthermore, the system controller 23 acquires the optical characteristic information from the interchangeable lens 2. For example, the system controller 23 acquires the optical characteristic information from the interchangeable lens 2 at a time of start and/or periodically, thereby successively recognizing optical characteristics of the interchangeable lens 2. The system controller 23 inputs the acquired optical characteristic information into the blur correction microcomputer 24.

Furthermore, the system controller 23 comprises a projection converting section 31 and a field angle segmenting section 32. The projection converting section 31 performs projection conversion to convert the projection system of the image data read from the imaging element 21. For example, the projection converting section 31 converts the image data of the equidistant projection system read from the imaging element 21 into image data of a central projection system. The field angle segmenting section 32 performs cropping to segment the image data converted into the central projection system by the projection converting section 31.

The blur correction microcomputer 24 is a microcomputer that executes control concerning the image blur correction. The blur correction microcomputer 24 acquires an angular velocity signal from the gyrosensor 25, and acquires the optical characteristic information of the interchangeable lens 2 from the system controller 23. The blur correction microcomputer 24 controls the blur correcting section 22 on the basis of the acquired angular velocity signal and optical characteristic information, thereby correcting the image blur. For example, the blur correction microcomputer 24 calculates a direction of the image blur and an image moving amount of the subject image on the imaging plane on the basis of the acquired angular velocity signal and optical characteristic information. The blur correction microcomputer 24 controls the blur correcting section 22 to move the imaging plane in an image blur canceling direction in accordance with the calculated image blur direction and image moving amount, thereby correcting the image blur. That is, the blur correction microcomputer 24 adjusts a positional relation between the subject image (an equidistant projection image) formed on the imaging plane by the optical system 11 of the equidistant projection system, and the imaging plane, thereby correcting the image blur.

The gyrosensor 25 detects, as the angular velocity signal, a rotary motion of the camera main body 3 which occurs by accompanying the change of the posture of the camera main body 3. The gyrosensor 25 detects, for example, the rotary motion in a pitch direction in which a horizontal direction of the imaging plane of the imaging element 21 is defined as an axis, and the rotary motion in a yaw direction in which a vertical direction of the imaging plane is defined as an axis, and generates the angular velocity signal. Furthermore, the gyrosensor 25 detects the rotary motion in a roll direction in which the optical axis of the optical system 11 is defined as an axis, and generates the angular velocity signal.

The EVF 26 displays various screens. The EVF 26 comprises a display device such as a liquid crystal display or an organic EL display, and an eyepiece optical system. The EVF 26 displays, in the display device, the screen generated by the system controller 23. Consequently, the EVF 26 can display, in the display device, an image obtained by the imaging element 21, a menu screen for setting, and the like. It is to be noted that the EVF 26 may be constituted of the display device disposed in a finder eyepiece portion as described above, or may be constituted of a display panel disposed in the camera main body 3.

The recording device 27 is a recording device that records the image file. The recording device 27 is, for example, a memory card.

The operating section 28 comprises operation members to be operated by a user. For example, the operating section 28 comprises a release button, a moving image recording button, and the like as the operation members. The release button is a button to execute still image photographing processing by the camera main body 3. Furthermore, the moving image recording button is a button that operates the camera main body 3 to execute moving image recording processing. Furthermore, the operating section 28 may comprise, as the operation member, a button to change the operation mode of the camera main body 3 or various setting of exposure control and the like. For example, the operating section 28 may comprise, as the operation member, a button to change setting of performing/non-performing of the projection conversion by the projection converting section 31, and setting of a segmenting size in the cropping by the field angle segmenting section 32.

Figure 2:
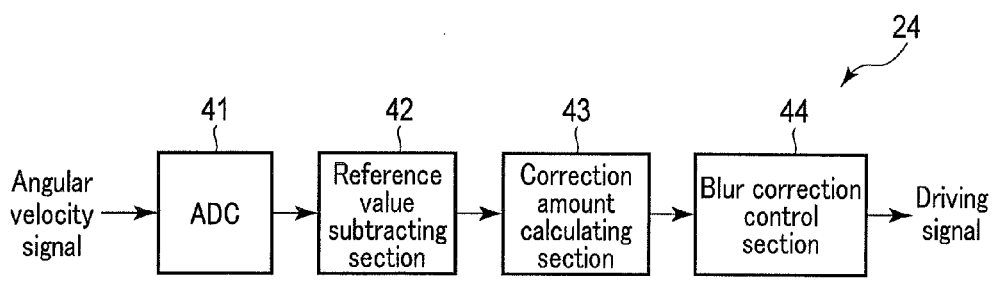
FIG. 2 is a diagram to explain a constitution example of a blur correction microcomputer of the imaging apparatus according to the first embodiment.

Next, details of the blur correction microcomputer 24 will be described. FIG. 2 is a diagram showing an example of a constitution of the blur correction microcomputer 24. As shown in FIG. 2, the blur correction microcomputer 24 comprises an analog/digital converter (ADC) 41, a reference value subtracting section 42, a correction amount calculating section 43, and a blur correction control section 44. According to the constitution shown in FIG. 2, it is possible to execute the control of the image blur correction of one direction in the imaging plane. That is, the blur correction microcomputer 24 comprises the constitution shown in FIG. 2 every direction to perform the image blur correction, so that it is possible to execute the control of the image blur correction in directions. Here, to simplify the description, the control of the image blur correction in the one direction by the blur correction microcomputer 24 will be described.

The ADC 41 converts an analog angular velocity signal output from the gyrosensor 25 into the digital signal, and outputs a digital angular velocity.

The reference value subtracting section 42 subtracts a reference value from a value of the angular velocity signal output from the ADC 41. The reference value is the value of the angular velocity signal when the camera main body 3 is in a stationary state. The reference value subtracting section 42 subtracts the reference value from the output of the ADC 41, thereby outputting a value of the angular velocity having a sign. At this time, the sign of the value of the angular velocity indicates a rotating direction.

The correction amount calculating section 43 calculates the image moving amount that is an amount of the blur of the subject image on the imaging plane which occurs by accompanying the posture change of the camera main body 3, and a direction of the image blur on the basis of the optical characteristic information of the optical system 11 which is supplied from the system controller 23 and the value of the angular velocity output from the reference value subtracting section 42. For example, the correction amount calculating section 43 recognizes a diagonal field angle (the focal distance) and the projection system on the basis of the optical characteristic information of the optical system 11 which is supplied from the system controller 23. The correction amount calculating section 43 calculates the image moving amount and the direction of the image blur of the subject image on the imaging plane in accordance with change of an incidence angle on the basis of the diagonal field angle and the projection system, and outputs the calculated image moving amount and the image blur direction as a correction amount.

Figure 3:
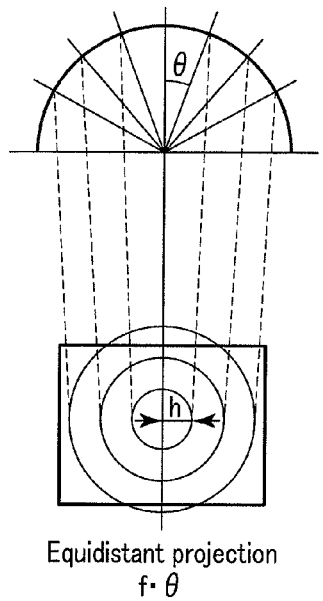
FIG. 3 is a diagram showing a relation between an incidence angle and an image height in an optical system of an equidistant projection system.

FIG. 3 is a diagram showing a relation between the incidence angle when the light enters the optical system 11 of such an equidistant projection system as described above and an image height (a position from an optical axis center herein). It is to be noted that the optical axis center herein is a position of the imaging element 21 on the imaging plane which crosses the optical axis of the optical system 11. The equidistant projection system is for use in the optical system called a so-called fisheye lens. In the lens of the equidistant projection system, an incidence angle $\theta$ is proportional to an image height h. For example, in a case of defining the focal distance of the optical system 11 as f, a relation of $h = f \cdot \theta$ is established among the image height h and the focal distance f and the incidence angle $\theta$. The correction amount calculating section 43 calculates $\Delta\theta$ that is a change amount of the incidence angle on the basis of the angular velocity output from the reference value subtracting section 42. Furthermore, when defining the image moving amount that accompanies the change of the incidence angle as $\Delta h$, the correction amount calculating section 43 calculates the image moving amount $\Delta h$ on the basis of $\Delta h = f \cdot \Delta\theta$.

The blur correction control section 44 controls the blur correcting section 22 in accordance with the correction amount output from the correction amount calculating section 43. The blur correction control section 44 generates the driving signal that operates the blur correcting section 22 to cancel the blur of the subject image, on the basis of the image moving amount and the image blur direction which are indicated by the correction amount output from the correction amount calculating section 43. The blur correction control section 44 inputs the driving signal into the blur correcting section 22 to control the image blur correction in the blur correcting section 22. The driving signal is a signal including a driving pulse to drive a motor disposed in the blur correcting section 22 or information such as a target driving position of the image blur correction by the blur correcting section 22.

Hereinafter, imaging processing in the present embodiment will be described. It is to be noted that the imaging processing includes the still image photographing processing of obtaining a still image and the moving image recording processing of obtaining a moving image.

Figure 4:
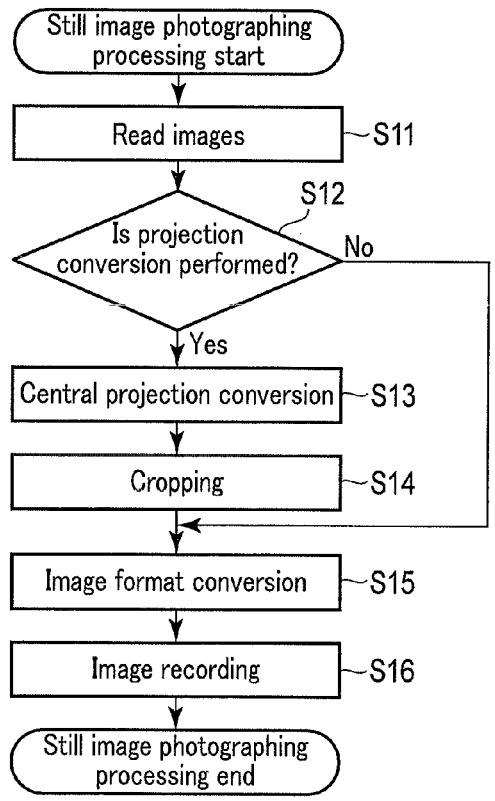
FIG. 4 is a flowchart to explain an example of an operation of the imaging apparatus according to the first embodiment.

FIG. 4 is a flowchart showing an operation of the imaging apparatus 1 that performs the still image photographing processing. It is to be noted that FIG. 4 shows an operation concerning projection conversion. Additionally, control concerned with camera shake correction, the exposure control of the imaging element 21 and the like are executed in parallel. Furthermore, image blur correction in the horizontal direction of the imaging plane of the imaging element 21 and image blur correction in the vertical direction of the imaging plane of the imaging element 21 are simultaneously performed, but operations of the respective image blur corrections are similar. Therefore, an example of the image blur correction in the horizontal direction will be described.

In a case of performing an operation of carrying out the still image photographing processing, the system controller 23 of the camera main body 3 executes control such as control of automatic focusing by the interchangeable lens 2 or the exposure control by the imaging element 21, thereby executing exposure by the imaging element 21.

When completing the exposure in the imaging element 21, the system controller 23 reads images (step S11). As described above, in a case where the optical system 11 is the lens constituted of the equidistant projection system, the system controller 23 acquires the image data of the equidistant projection system from the imaging element 21.

The system controller 23 judges whether or not to perform the projection conversion (step S12). For example, the system controller 23 judges that the controller performs the projection conversion, in a case where the projection system of the optical characteristic information beforehand acquired from the LCU 13 is the equidistant projection system, i.e., in a case where the interchangeable lens 2 comprising the optical system 11 of the equidistant projection system is connected to the camera main body 3. Furthermore, the system controller 23 comprises, for example, a memory that stores setting of performing/non-performing of the projection conversion by the projection converting section 31. The system controller 23 may be set to perform the projection conversion by the projection converting section 31 with reference to the memory, and may be constituted to judge that the section performs the projection conversion in a case where the optical system 11 of the interchangeable lens 2 is the equidistant projection system.

In a case of judging in the step S12 that the section performs the projection conversion (the step S12, YES), the projection converting section 31 of the system controller 23 converts the image data of the equidistant projection system which is acquired in the step S11 into image data of the central projection system (step S13). That is, the projection converting section 31 generates central projection of the image data. In a case of judging in the step S12 that the section does not perform the projection conversion (the step S12, NO), the system controller 23 shifts to processing of step S15 without performing the projection conversion.

FIG. 5 is an explanatory view schematically showing an example to convert the image data of the equidistant projection system into the image data of the central projection system. According to the central projection system, the relation of $h = f \cdot \tan \theta$ is established among the image height h and the focal distance f and the incidence angle $\theta$. In the case of converting the image data of the equidistant projection system into the image data of the central projection system, the projection converting section 31 recognizes the incidence angle $\theta$ corresponding to each image point of the image data of the equidistant projection system on the basis of the optical characteristic information acquired by the system controller 23. For example, the projection converting section 31 recognizes the focal distance of the optical system 11 in accordance with the zoom position indicated by the optical characteristic information. The projection converting section 31 recognizes the incidence angle $\theta$ corresponding to each image point in accordance with the focal distance of the optical system 11.

FIG. 6 is an explanatory view showing an example of a relation among the zoom position and the focal distance and the diagonal field angle. For example, in a case where the zoom position indicated by the optical characteristic information is 3, the projection converting section 31 recognizes that the focal distance is 20 mm and the diagonal field angle is 124°. The projection converting section 31 equally divides a diagonal angle of the image data by an angle, thereby calculating the incidence angle $\theta$ corresponding to each image point. That is, the projection converting section 31 acquires the diagonal field angle on the basis of the optical characteristic information of the optical system 11, and calculates the incidence angle $\theta$ corresponding to each image point on the basis of the acquired diagonal field angle.

In a case of performing the central projection generation, the projection converting section 31 converts a coordinate of each image point based on a position of the optical axis center of the optical system 11 on the image data. For example, as shown in FIG. 5, the projection converting section 31 performs the coordinate conversion of each image point that is present at a position of $h = f \cdot \theta$ in the image data of the equidistant projection system into a position of $f \cdot \tan \theta$, thereby converting the image data of the equidistant projection system into the image data of the central projection system.

In a case of still image photographing, the exposure starts in a state where a center of the imaging plane matches the optical axis center of the optical system 11. Consequently, a field angle center of the image data in the still image photographing matches the optical axis center of the optical system 11. In the case of performing the central projection generation, the projection converting section 31 converts the coordinate of each image point based on a position of the field angle center of the image data.

It is to be noted that the projection converting section 31 may have a constitution in which the section does not convert the image data of the equidistant projection system into the image data of the central projection system, but converts the image data of the equidistant projection system into the image data of another projection system.

The field angle segmenting section 32 performs the cropping to segment the image data converted into the central projection system by the projection converting section 31

(step S14). FIG. 7 is an explanatory view to explain an example of the cropping to be executed by the field angle segmenting section 32. The field angle segmenting section 32 sets a segmenting region on the image data converted into the central projection system in accordance with a field angle to be recorded as the image file. The field angle segmenting section 32 sets, for example, a rectangular segmenting region based on a center of the image data converted into the central projection system. The field angle segmenting section 32 segments the image data of the central projection system in the segmenting region.

The system controller 23 converts the image data segmented by the field angle segmenting section 32 into an image format for recording, thereby generating the image file for recording (the step S15). The system controller 23 records the image file in the recording device 27 (step S16), and ends the still image photographing processing.

Figure 8:
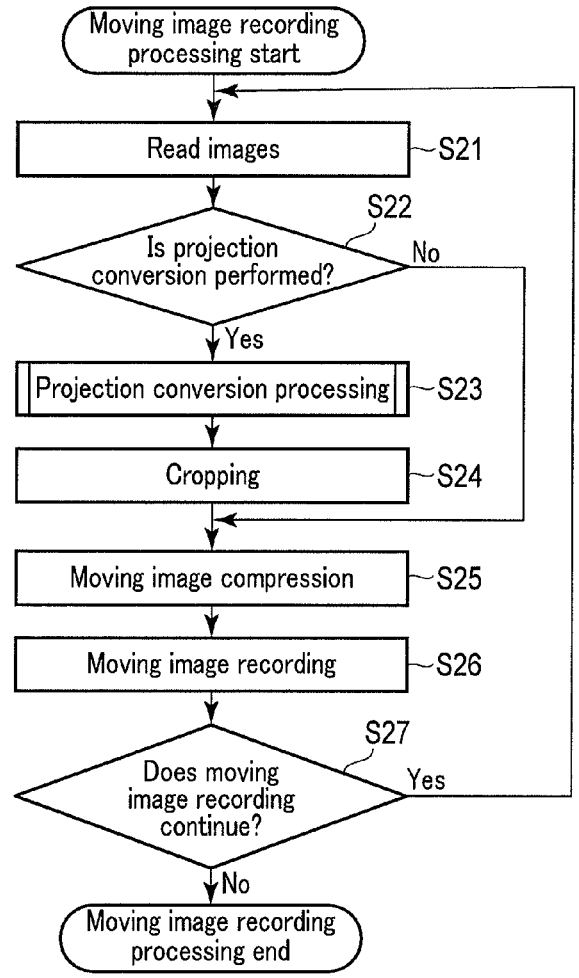
FIG. 8 is a flowchart to explain an example of the operation of the imaging apparatus according to the first embodiment.

FIG. 8 is a flowchart showing an operation of the imaging apparatus 1 that performs the moving image recording processing. It is to be noted that FIG. 8 shows an operation concerning the projection conversion. Additionally, the control concerned with the camera shake correction, the exposure control of the imaging element 21 and the like are executed in parallel. Furthermore, the image blur correction in the horizontal direction of the imaging plane of the imaging element 21 and the image blur correction in the vertical direction of the imaging plane of the imaging element 21 are simultaneously performed, but the operations of the respective image blur corrections are similar. Therefore, an example of the image blur correction in the horizontal direction will be described.

In a case where of performing an operation of carrying out the moving image recording processing, the system controller 23 of the camera main body 3 executes control such as the control of the automatic focusing by the interchangeable lens 2 or the exposure control by the imaging element 21, thereby starting the exposure by the imaging element 21.

In a case of performing the moving image recording processing, the system controller 23 periodically reads the images from the imaging element 21 while continuously executing the exposure by the imaging element 21 (step S21). As described above, in the case where the optical system 11 is the lens constituted of the equidistant projection system, the system controller 23 acquires, from the imaging element 21, the image data of the equidistant projection system for one frame.

The system controller 23 judges whether or not to perform projection conversion processing (step S22). For example, the system controller 23 judges that the controller performs the projection conversion processing, in the case where the projection system of the optical characteristic information beforehand acquired from the LCU 13 is the equidistant projection system, i.e., the case where the interchangeable lens 2 comprising the optical system 11 of the equidistant projection system is connected to the camera main body 3. Furthermore, the system controller 23 comprises, for example, the memory that stores setting of performing/non-performing of the projection conversion processing by the projection converting section 31. The system controller 23 may be set to perform the projection conversion processing by the projection converting section 31 with reference to the memory, and may be constituted to judge that the controller performs the projection conversion processing in the case where the optical system 11 of the interchangeable lens 2 is the equidistant projection system.

In a case of judging in the step S22 that the controller does not perform the projection conversion processing (the step S22, NO), the system controller 23 shifts to processing of step S25 without performing the projection conversion processing.

Furthermore, in a case of judging in the step S22 that the projection converting section performs the projection conversion processing (the step S22, YES), the projection converting section 31 of the system controller 23 performs the projection conversion processing on the basis of the image data of the equidistant projection system acquired in the step S21 (step S23). In a case of performing the projection conversion processing, the projection converting section 31 specifies the position of the optical axis center of the optical system 11 on the image data of the equidistant projection system acquired in the step S21, and converts the image data of the equidistant projection system into the data of the central projection system based on the specified optical axis center.

The field angle segmenting section 32 performs the cropping to segment the image data converted into the central projection system by the projection converting section 31 (step S24). The field angle segmenting section 32 performs the cropping similarly to the example shown in FIG. 7. The field angle segmenting section 32 sets the segmenting region on the image data converted into the central projection system in accordance with the field angle to be recorded as the image file. The field angle segmenting section 32 sets, for example, the rectangular segmenting region based on the center of the image data converted into the central projection system. The field angle segmenting section 32 segments the image data of the central projection system in the segmenting region.

The system controller 23 compresses the segmented image data into a moving image format (the step S25), and records moving image data in the recording device 27 (step S26).

Furthermore, the system controller 23 judges whether or not the moving image recording processing continues (step S27). In a case of judging that the moving image recording processing continues (the step S27, YES), the system controller 23 shifts to the step S21 to perform moving image recording processing for the next frame. In a case of judging that the moving image recording processing does not continue (the step S27, NO), the system controller 23 ends the moving image recording processing.

Figure 9:
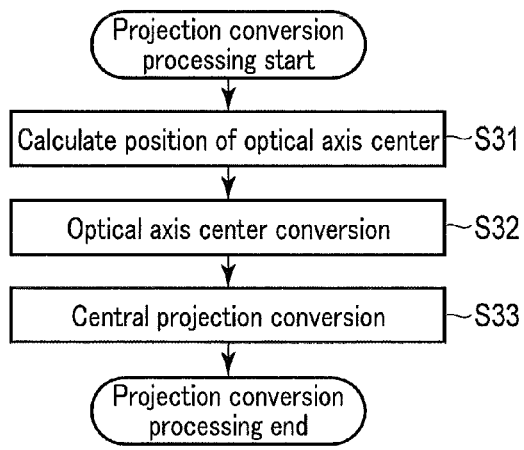
FIG. 9 is a flowchart to explain an example of the operation of the imaging apparatus according to the first embodiment.

Next, the projection conversion processing of the above step S23 will be described with reference to FIG. 9 to FIG. 11. FIG. 9 is a flowchart showing an operation of the imaging apparatus 1 that performs the projection conversion processing.

As described above, when the moving image recording processing is performed while performing the blur correction by a sensor shift system to move the imaging plane of the imaging element 21, there is the possibility that the imaging plane moves during exposure of the previous frame. Consequently, at a time of exposure start, the center of the imaging plane might not match the optical axis center of the optical system 11. In consequence, the projection converting section 31 performs optical axis center conversion to convert the position of the optical axis center of the optical system 11 on the image data of the equidistant projection system into the center of the field angle of the image data before converting the image data of the equidistant projection system into the image data of the central projection system.

The projection converting section 31 calculates a moving amount of the imaging plane by the blur correction of the center shift system, thereby calculating a moving position of the optical axis center of the optical system 11 (step S31). In the blur correction of the sensor shift system, the imaging plane moves to cancel movement of the image which occurs due to angle change that accompanies camera shake. Consequently, the position of the optical axis center of the optical system 11 on the imaging plane moves in accordance with the movement of the imaging plane. In the equidistant projection system, the change of the incidence angle of the light which accompanies the camera shake matches (or is proportional to) the moving amount of the subject image on the imaging plane. Consequently, the projection converting section 31 recognizes the diagonal field angle on the imaging plane on the basis of the optical characteristic information of the interchangeable lens 2, and calculates a moving amount of the position of the optical axis center of the optical system 11 on the imaging plane on the basis of the angular velocity signal.

Next, the projection converting section 31 performs the optical axis center conversion to convert the image data in which the center of the field angle shifts from the center of the optical axis of the optical system 11 into the image data in which the center of the field angle matches the center of the optical axis of the optical system 11 (step S32).

Figure 10:
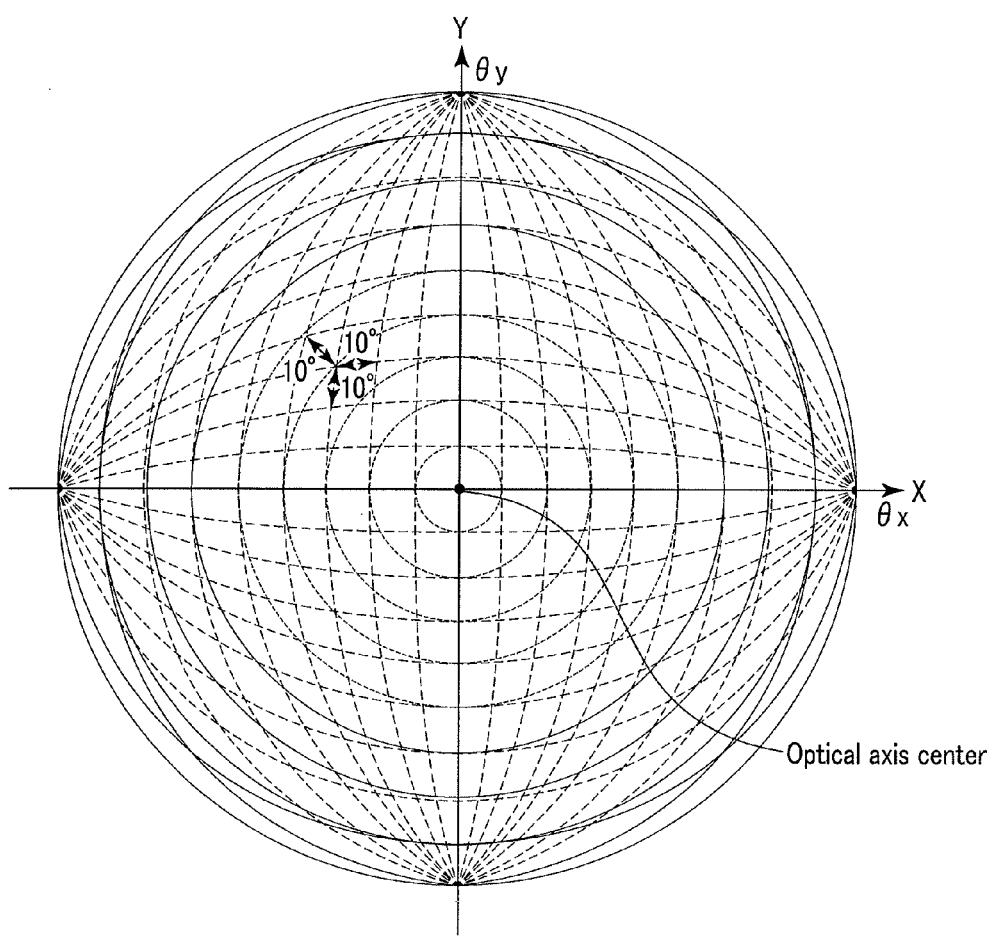
FIG. 10 is a diagram to explain an example of optical axis center conversion according to the first embodiment.

FIG. 10 and FIG. 11 are explanatory views to explain the optical axis center conversion. FIG. 10 shows a coordinate of an image in a case of forming the image of the whole sky (the whole viewing field of 180°) with the optical system of the equidistant projection. The optical system is the equidistant projection, and hence it is possible to cut a field from the center of the optical axis to a viewing field end (90°) at equal intervals each of which is proportional to the angle. The example of FIG. 10 shows concentric coordinates every 10°. In the optical system of the equidistant projection system, a straight line that is infinitely distantly positioned and superimposed on the optical axis is formed as a linear subject image along a photographing viewing field from its one edge to the other edge. However, in the optical system of the equidistant projection system, in a case where there is a shift of the angle, a straight line that is infinitely distantly positioned and is not superimposed on the optical axis is formed as a subject image of a line that is distorted along the photographing viewing field from the one edge to the other edge. The distortion of the subject image increases in proportion to an angle formed between the incidence angle of the light into the image point and the optical axis.

The example of FIG. 10 shows the projection of the straight line as a broken line every shift of 10° in each of an X-direction (the horizontal direction) and a Y-direction (the vertical direction). In a case of defining the shift of the angle in the X-direction as $\theta x$ and defining the shift of the angle in the Y-direction as $\theta y$, it is possible to approximate a vertical line and a horizontal line in coordinates as follows.

Vertical line: $(\theta x \cdot \cos \theta y, \theta y)$

Horizontal line: $(\theta x, \theta y \cdot \cos \theta x)$

Figure 11A:
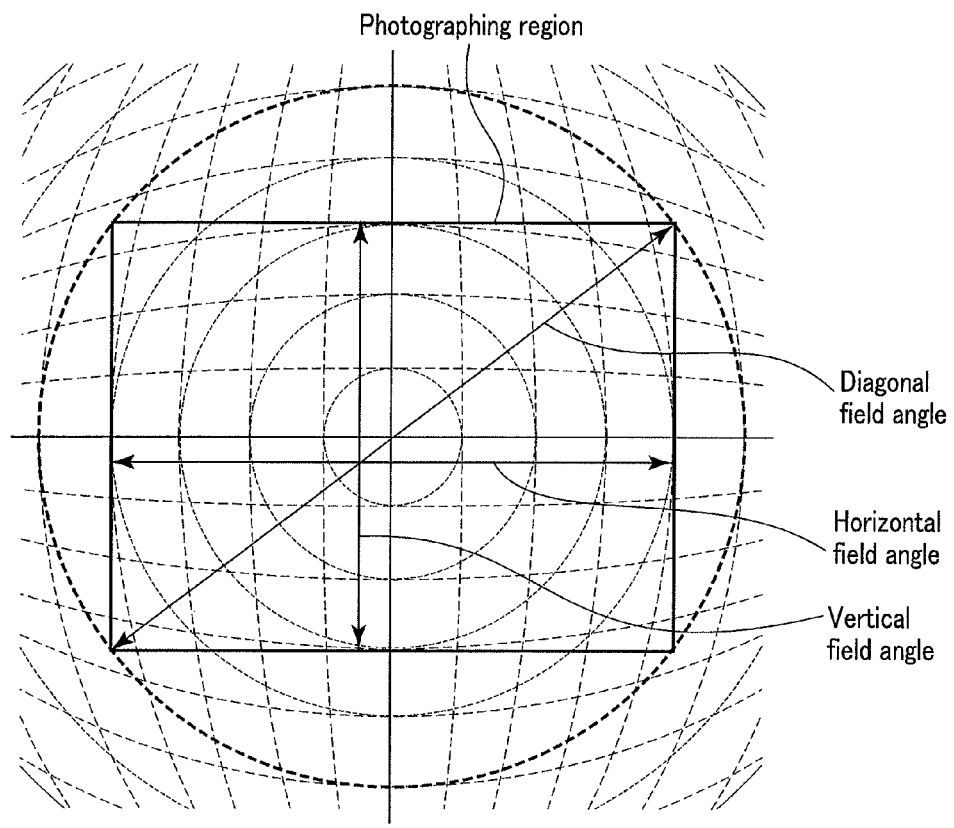
FIG. 11A is a diagram to explain an example of the optical axis center conversion according to the first embodiment.

For example, the subject image shown in FIG. 10 is segmented with the photographing viewing field having a diagonal field angle of 100°, a horizontal field angle of about 80° and a vertical field angle of about 60° as shown in FIG. 11A. In this case, it is possible to estimate the distortion in the image from the optical axis center and the diagonal field angle.

Figure 11B:
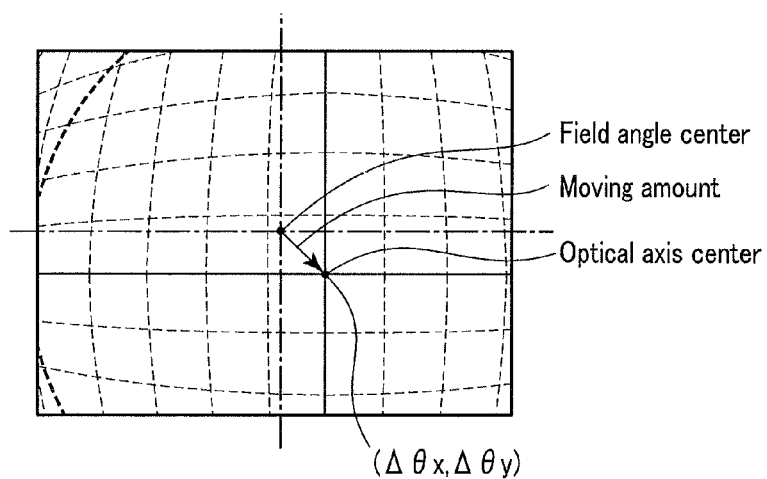
FIG. 11B is a diagram to explain an example of the optical axis center conversion according to the first embodiment.

For example, in a case where as shown in FIG. 11B, a center of the image is (0, 0) and angle change occurs as much as $\Delta\theta x$ in the horizontal direction and as much as $\Delta\theta y$ in the vertical direction, the center of the optical axis of the optical system 11 moves to $(\Delta\theta x, \Delta\theta y)$ in the field angle.

Figure 11C:
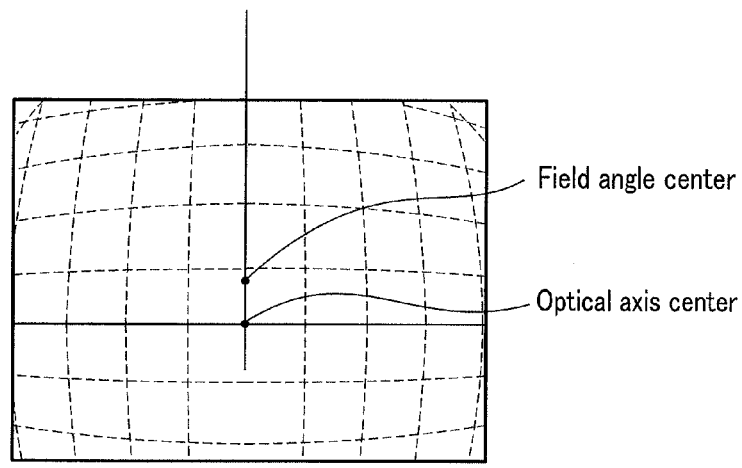
FIG. 11C is a diagram to explain an example of the optical axis center conversion according to the first embodiment.
Figure 11D:
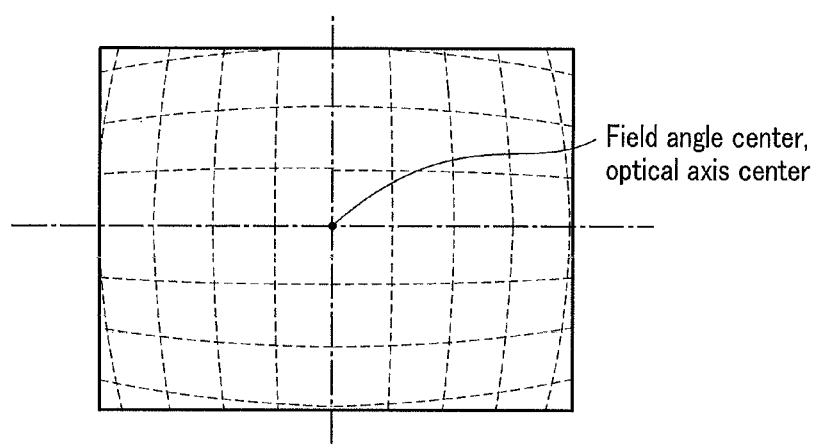
FIG. 11D is a diagram to explain an example of the optical axis center conversion according to the first embodiment.

The projection converting section 31 performs coordinate conversion so that the center of the optical axis of the optical system 11 becomes the center of the image segmented in the photographing viewing field. For example, the projection converting section 31 converts the image shown in FIG. 11B so that the center of the optical axis of the optical system 11 becomes the center of the image in the X-direction as shown in FIG. 11C. In this case, the projection converting section 31 moves the image point of a coordinate $(\theta x \cdot \cos \theta y, \theta y)$ to a coordinate $(\theta x \cdot \cos(\theta y - \Delta\theta y), \theta y)$. Furthermore, the projection converting section 31 converts the image shown in FIG. 11C so that the center of the optical axis of the optical system 11 becomes the center of the image in the Y-direction as shown in FIG. 11D. In this case, the projection converting section 31 moves the image point of a coordinate $(\theta x, \theta y \cdot \cos \theta x)$ to a coordinate $(\theta x, \theta y \cdot \cos(\theta x - \Delta\theta x))$.

According to the above processing, the projection converting section 31 convers the image in which the center of the field angle shifts from the center of the optical axis of the optical system 11 as shown in FIG. 11B into the image in which the center of the field angle matches the center of the optical axis of the optical system 11 as shown in FIG. 11D.

It is to be noted that the optical axis center conversion by the projection converting section 31 is not limited to the above-mentioned method. The projection converting section 31 may be constituted to perform the optical axis center conversion-by any method.

As shown in FIG. 9, the projection converting section 31 converts the image data of the equidistant projection system which is subjected to the optical axis center conversion in the step S32, into the image data of the central projection system (step S33). For example, the projection converting section 31 performs the coordinate conversion of each image point that is present at the position of $h=f\cdot\theta$ into the position of $f\cdot\tan\theta$ in the image data of the equidistant projection system subjected to the optical axis center conversion in the step S32, thereby converting the image data of the equidistant projection system into the image data of the central projection system.

It is to be noted that the projection converting section 31 executes the projection conversion processing shown in the step S31 to the step S33 to elongate the image data. Consequently, the projection converting section 31 may be constituted to adjust sharpness of the elongated image data or correct deterioration of the image which accompanies the elongation by a known technique such as resampling.

As described above, the optical system 11 of the imaging apparatus 1 is constituted of the equidistant projection system in which the image moving amount of the subject image is uniform to the change of the incidence angle of the entering light, and forms the image of the light from the subject as the subject image on the imaging plane of the imaging element 21. The blur correcting section 22 and the blur correction microcomputer 24 of the optical system 11 of the imaging apparatus 1 shift the imaging plane of the imaging element 21 in accordance with the angular velocity that occurs by accompanying the posture change of the imaging apparatus 1, thereby correcting the blur of the subject image which occurs by accompanying the posture change of the imaging apparatus 1. The system controller 23 of the imaging apparatus 1 carries out the exposure by the imaging element 21 while correcting the blur of the subject image by the blur correcting section 22 and the blur correction microcomputer 24, thereby acquiring the image data of the equidistant projection system in which the blur is corrected. The imaging apparatus 1 converts the acquired image data of the equidistant projection system into the image data of the central projection system.

According to such a constitution, the imaging apparatus 1 can perform the blur correction by adjusting a positional relation between the subject image in which the image moving amount of the subject image is uniform to the change of the incidence angle of the entering light and the imaging plane of the imaging element 21. Consequently, it is possible to prevent the blur correction amount from increasing or decreasing to the image moving amount as in a time of performing the blur correction to the subject image of the central projection system. As a result, the imaging apparatus 1 can acquire the image data of the central projection system in which the blur correction is appropriately performed along the whole region.

Furthermore, in a case where the imaging plane of the imaging element 21 has already shifted at the start of the exposure, the system controller 23 of the imaging apparatus 1 specifies the coordinate superimposed on the optical axis center of the optical system 11 in the obtained image data, and performs the optical axis center conversion to convert the specified coordinate into the center of the field angle of the image data, thereby converting the image data of the equidistant projection system into the image data of the central projection system. Consequently, even in the case where the imaging plane of the imaging element 21 has already shifted at the start of the exposure, the imaging apparatus 1 can acquire the image data of the central projection system in which the blur correction is appropriately performed along the whole region.

Second Embodiment

Hereinafter, an example of an imaging apparatus 1A according to a second embodiment will be described with reference to FIG. 12 to FIG. 14. It is to be noted that a constitution similar to the imaging apparatus 1 according to the first embodiment is denoted with the same reference signs, and its detailed description is omitted.

Figure 12:
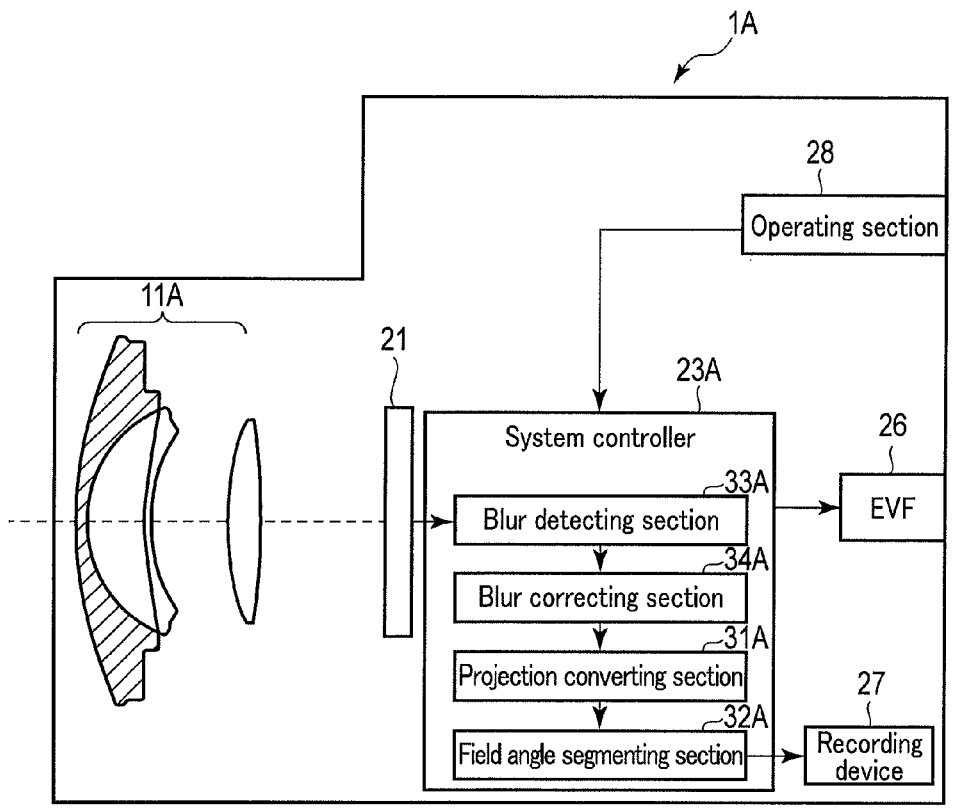
FIG. 12 is a diagram to explain a constitution example of an imaging apparatus according to a second embodiment.

FIG. 12 shows the constitution example of the imaging apparatus 1A. The imaging apparatus 1A is a lens-integrated camera that performs electronic blur correction. For example, the imaging apparatus 1A is a so-called action camera that specializes in moving image photography. The imaging apparatus 1A comprises an optical system 11A, an imaging element 21, a system controller 23A, an EVF 26, a recording device 27, and an operating section 28.

The optical system 11A is an imaging lens of an equidistant projection system. The optical system 11A is different from the optical system 11 in that the system is a single focus lens in which it is not possible to change a focal distance.

The system controller 23A is a controller that includes, for example, a CPU, a memory and the like and controls an operation of the imaging apparatus 1A in the same manner as in the system controller 23. The system controller 23A performs control of exposure by the imaging element 21, reading of image data, and image processing to the read image data. The system controller 23A comprises a projection converting section 31A, a field angle segmenting section 32A, a blur detecting section 33A, and a blur correcting section 34A.

The blur detecting section 33A detects an image moving amount that accompanies posture change of the imaging apparatus 1A on the basis of pieces of image data which are continuously acquired. For example, the blur detecting section 33A detects moving vectors from the pieces of image data which are continuously acquired by pattern matching to detect the image moving amount.

The blur correcting section 34A specifies an effective region in the image data acquired by the imaging element 21 on the basis of the detected image moving amount. The effective region indicates a region to be left as a file of the image data. The blur correcting section 34A segments (extracts) an image in the effective region of the image data as a frame image. The frame image is continuously photographed image data, and is an element constituting a moving image.

Figure 13A:
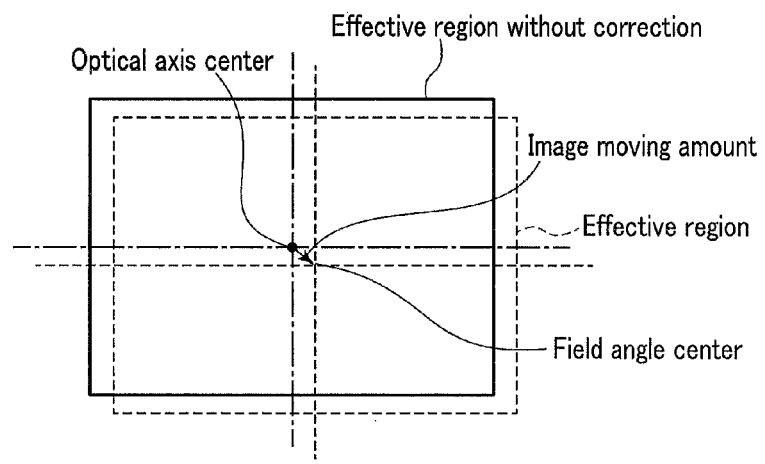
FIG. 13A is a diagram to explain an example of optical axis center conversion according to the second embodiment.

For example, as shown in FIG. 13A, the blur correcting section 34A specifies the effective region in which a center of the effective region (a center of a field angle) matches an optical axis center of the optical system 11A, in a case where correction is not performed, i.e., a case where the image moving amount is not present. Furthermore, as shown in FIG. 13A, the blur correcting section 34A moves the effective region in accordance with the image moving amount. Specifically, the blur correcting section 34A moves the effective region in the same direction as an image moving direction and as much as the same length as an image moving length. Consequently, the blur correcting section 34A can inhibit change that accompanies blur of a position of a subject image in the continuously acquired frame images. Furthermore, the blur correcting section 34A accumulates and calculates the image moving amounts supplied from the blur detecting section 33A from start of the exposure, thereby recognizing a shift between the center of the field angle of each frame image and the optical axis center of the optical system 11A.

The projection converting section 31A performs projection conversion to convert a projection system of the frame image. In a case of performing projection conversion processing, as shown in FIG. 13B, the projection converting section 31A specifies a position of the optical axis center of the optical system 11A on the frame image, and converts the frame image into the image data of a central projection system based on the specified optical axis center.

The field angle segmenting section 32A performs cropping to segment the image data converted into the central projection system by the projection converting section 31A. The field angle segmenting section 32A specifies an image point corresponding to the center of the field angle of the frame image before performing the projection conversion processing, on the image data converted into the central projection system by the projection converting section 31A. The field angle segmenting section 32A performs the cropping to segment a predetermined field angle based on the specified image point.

Figure 14:
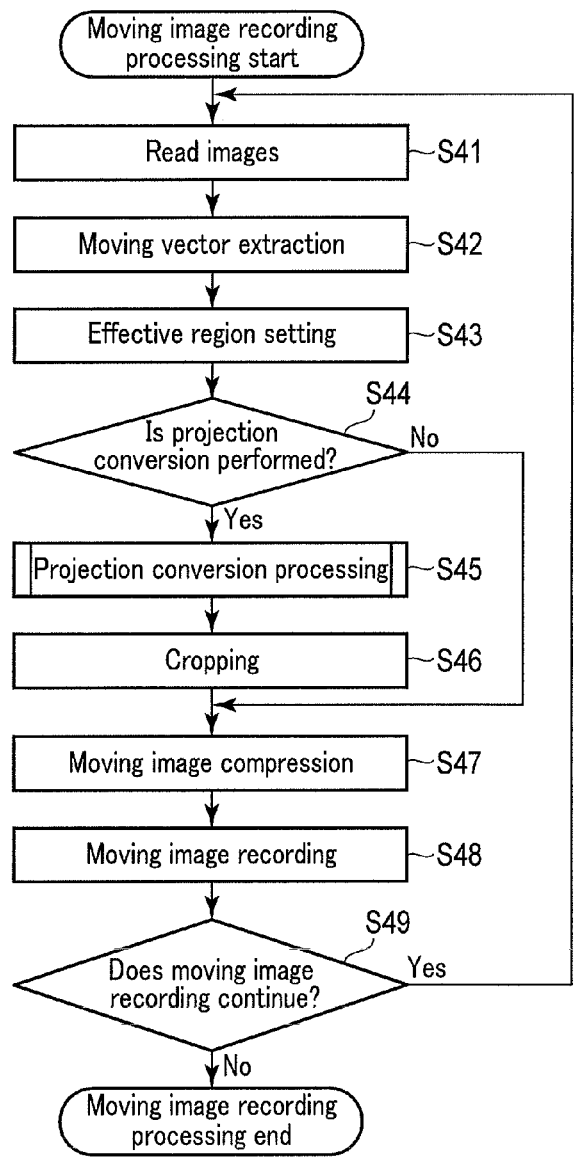
FIG. 14 is a flowchart to explain an example of an operation of the imaging apparatus according to the second embodiment.

FIG. 14 is a flowchart showing an operation of the imaging apparatus 1A that performs moving image recording processing. It is to be noted that the imaging apparatus 1A executes exposure control of the imaging element 21, and the like in parallel with and in addition to the operation shown in FIG. 14.

In a case of performing an operation of carrying out the moving image recording processing, the system controller 23A of the imaging apparatus 1A executes control such as the exposure control by the imaging element 21, thereby starting the exposure by the imaging element 21.

In the case of performing the moving image recording processing, the system controller 23A periodically reads images from the imaging element 21 while continuously executing the exposure by the imaging element 21 (step S41). As described above, in a case where the optical system 11A is the lens constituted of the equidistant projection system, the system controller 23A acquires the image data of the equidistant projection system for one frame from the imaging element 21.

The blur detecting section 33A of the system controller 23A compares the already acquired image data with the image data acquired in the step S41, thereby extracting the moving vector (step S42). For example, the blur detecting section 33A of the system controller 23A performs the pattern matching of the previously acquired image data and the image data acquired in the step S41, or the like, thereby extracting, as the moving vector, a difference between the position of the subject image in the previous image data and the position of the subject image in the image data acquired in the step S41.

The blur correcting section 34A of the system controller 23A specifies the effective region on the image data acquired in the step S41 on the basis of the moving vector extracted in the step S42 (step S43). The system controller 23A segments the image in the effective region as the frame image. For example, the blur correcting section 34A of the system controller 23A moves the effective region of the previously acquired image data at an imaging time in accordance with the moving vector to specify a new effective region.

The system controller 23A judges whether or not to perform the projection conversion processing (step S44). For example, the system controller 23A comprises the memory that stores setting of performing/non-performing of the projection conversion processing by the projection converting section 31A. The system controller 23A may be constituted to judge that the controller performs the projection conversion processing in a case of setting that the projection converting section 31A performs the projection conversion processing with reference to the memory.

In a case of judging in the step S44 that the controller does not perform the projection conversion processing (the step S44, NO), the system controller 23A shifts to processing of step S47 without performing the projection conversion processing.

Furthermore, in a case of judging in the step S44 that the controller performs the projection conversion processing (the step S44, YES), the projection converting section 31A of the system controller 23A performs the projection conversion processing on the basis of the frame image acquired in the step S43 (step S45). In the case of performing the projection conversion processing, the projection converting section 31A specifies the position of the optical axis center of the optical system 11A on the frame image, and converts the frame image into the data of the central projection system based on the specified optical axis center. For example, the projection converting section 31A specifies the position of the optical axis center of the optical system 11A on the frame image on the basis of the shift between the center of the field angle of each frame image and the optical axis center of the optical system 11A which is recognized by the blur correcting section 34A.

It is to be noted that the projection conversion processing is similar to the example shown in FIG. 9, and hence detailed description is omitted. The projection conversion processing in the present embodiment is different from the projection conversion processing of the first embodiment in the following respects. In the first embodiment, for the purpose of returning the optical axis center which has shifted from the center of the field angle back to the center of the field angle, the image point of the coordinate ($\theta x \cdot \cos \theta y$, $\theta y$) in which $\Delta \theta x$ and $\Delta \theta y$ are change amounts of the angle moves to the coordinate ($\theta x \cdot \cos(\theta y - \Delta \theta y)$, $\theta y$), and the image point of the coordinate ($\theta x$, $\theta y \cdot \cos \theta x$) moves to the coordinate ($\theta x$, $\theta y \cdot \cos(\theta x - \Delta \theta x)$). However, in the second embodiment, the optical axis center that is present at the center of the field angle moves to a position corresponding to $\Delta \theta x$ and $\Delta \theta y$ which are the change amounts of the angle. Consequently, the projection converting section 31A moves the image point of the coordinate ($\theta x \cdot \cos \theta y$, $\theta y$) to a coordinate ($\theta x \cdot \cos(\theta y + \Delta \theta y)$, $\theta y$), and moves the image point of the coordinate ($\theta x$, $\theta y \cdot \cos \theta x$) to a coordinate ($\theta x$, $\theta y \cdot \cos(\theta x + \Delta \theta x)$).

The field angle segmenting section 32A performs the cropping to segment the frame image converted into the central projection system by the projection converting section 31A (step S46). The field angle segmenting section 32A specifies the image point corresponding to the center of the field angle of the frame image before performing the projection conversion processing, on the image data converted into the central projection system. The field angle segmenting section 32A sets, in accordance with the field angle to be recorded as an image file, a segmenting region on the frame image converted into the central projection system based on the specified image point. The field angle segmenting section 32A segments the frame image of the central projection system in the segmenting region.

The system controller 23A compresses the segmented frame image into a moving image format (step S47), and records the image data in the recording device 27 (step S48).

Furthermore, the system controller 23A judges whether or not the moving image recording processing continues (step S49). In a case of judging that the moving image recording processing continues (the step S49, YES), the system controller 23A shifts to the step S41 to perform moving image recording processing for the next frame. In a case of judging that the moving image recording processing does not continue (the step S49, NO), the system controller 23A ends the moving image recording processing.

Also according to the above-mentioned constitution, similarly to the first embodiment, the imaging apparatus 1A can adjust a positional relation between the subject image in which the image moving amount of the subject image is uniform to the change of an incidence angle of entering light and an imaging plane of the imaging element 21 to perform the blur correction. As a result, the imaging apparatus 1A can acquire the image data of the central projection system in which the blur correction is appropriately performed along the whole region.

Furthermore, in a case where detected blur is large in the first embodiment, i.e., a case where the angular velocity detected by the gyrosensor 25 is not less than a preset threshold value, the constitution described in the first embodiment may be combined with a constitution to perform the electronic blur correction described in the second embodiment. Consequently, it is possible to correct the large blur.

Furthermore, in a case where the optical axis center of the optical system 11 shifts from the center of the imaging plane at the start of the exposure in the first embodiment, the constitution described in the first embodiment may be combined with a constitution to perform optical axis center conversion in which the center of the field angle of the image data matches the optical axis center.

Third Embodiment

Hereinafter, an example of an imaging apparatus 1B according to a third embodiment will be described with reference to FIG. 15 and FIG. 16. It is to be noted that constitution similar to the imaging apparatus 1 according to the first embodiment is denoted with the same reference signs, and its detailed description is omitted.

Figure 15:
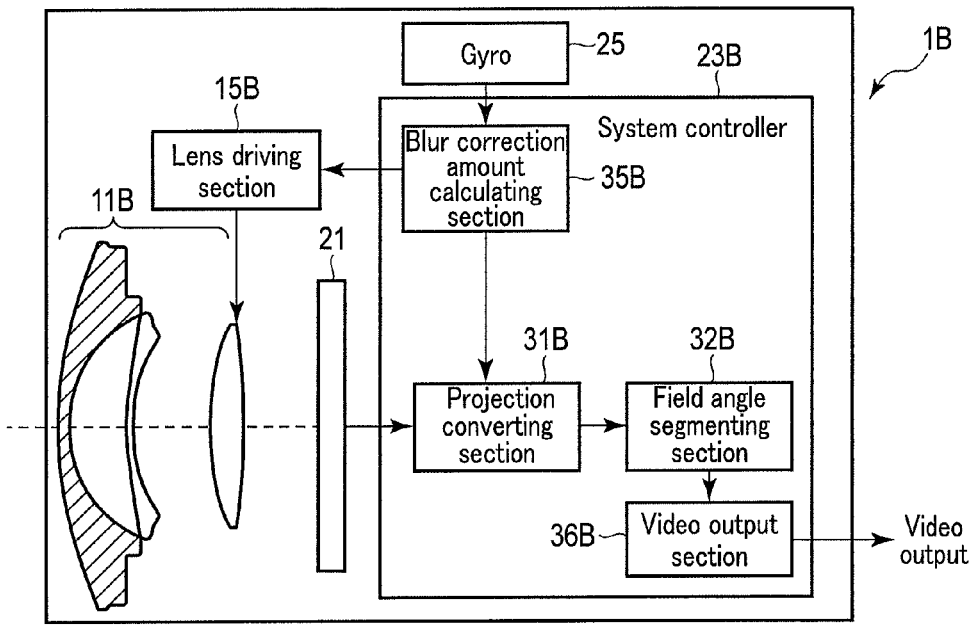
FIG. 15 is a diagram to explain a constitution example of an imaging apparatus according to a third embodiment.

FIG. 15 shows the constitution example of the imaging apparatus 1B. The imaging apparatus 1B is a lens-integrated camera that performs lens shift type blur correction. For example, the imaging apparatus 1B is an imaging module included for use in a mobile terminal such as a cellular phone or a smart phone. The imaging apparatus 1B comprises an optical system 11B, a lens driving section 15B, an imaging element 21, a system controller 23B, and a gyro-sensor 25.

The optical system 11B is an imaging lens of an equidistant projection system. The optical system 11B is different from the optical system 11 in that the system is a single focus lens in which it is not possible to change a focal distance, and comprises a correcting lens that corrects blur of a subject image formed on an imaging plane of the imaging element 21.

The lens driving section 15B drives the correcting lens of the optical system 11B, thereby correcting the blur of the subject image formed on the imaging plane of the imaging element 21. The lens driving section 15B drives the correcting lens of the optical system 11B in accordance with a driving signal supplied from the system controller 23B, thereby moving, on the imaging plane, the subject image formed on the imaging plane of the imaging element 21, and thereby adjusting a positional relation between the imaging plane and the subject image to correct the blur.

The system controller 23B is a controller that includes, for example, a CPU, a memory and the like and controls an operation of the imaging apparatus 1B in the same manner as in the system controller 23. The system controller 23B performs control of exposure by the imaging element 21, reading of image data, and image processing to the read image data. The system controller 23B receives, for example, an operation signal, a control signal and the like from a host apparatus including the imaging apparatus 1B to execute various types of processing. The system controller 23B comprises a projection converting section 31B, a field angle segmenting section 32B, a blur correction amount calculating section 35B, and a video output section 36B.

The blur correction amount calculating section 35B controls the lens driving section 15B on the basis of, for example, an angular velocity signal supplied from the gyro-sensor 25, and optical characteristic information indicating a focal distance, a projection system and the like of the optical system 11B, thereby correcting image blur. The blur correction amount calculating section 35B calculates a direction of the image blur and an image moving amount of the subject image on the imaging plane on the basis of the angular velocity signal and the optical characteristic information. The blur correction amount calculating section 35B drives the correcting lens by the lens driving section 15B to move the subject image in a direction to cancel the image blur in accordance with the calculated image blur direction and image moving amount, thereby correcting the image blur. That is, the blur correction amount calculating section 35B adjusts the positional relation between the subject image (an equidistant projection image) formed on the imaging plane by the optical system 11B of the equidistant projection system and the imaging plane, thereby correcting the image blur. It is to be noted that the blur correction amount calculating section 35B may be constituted to receive the angular velocity signal from the host apparatus including the imaging apparatus 1B, thereby performing the blur correction.

The projection converting section 31B performs projection conversion to convert the projection system of the image data read from the imaging element 21.

The field angle segmenting section 32B performs cropping to segment the image data converted into a central projection system by the projection converting section 31.

The video output section 36B outputs, from the imaging apparatus 1B, the image data cropped by the field angle segmenting section 32B. For example, the video output section 36B adds a synchronous signal to the cropped image data to output a video signal (a video frame) to the host apparatus including the imaging apparatus 1B. The video signal indicates, for example, color information of each pixel synchronized with a vertical synchronous signal and a horizontal synchronous signal. The video output section 36B adds the synchronous signal to the cropped image data to output the video signal to the host apparatus including the imaging apparatus 1B, so that the host apparatus can perform through image display or the like.

Figure 16:
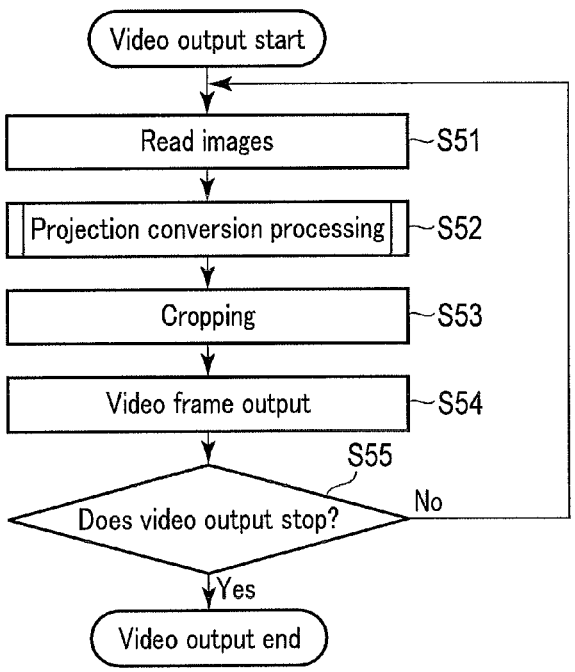
FIG. 16 is a flowchart to explain an example of an operation of the imaging apparatus according to the third embodiment.

FIG. 16 is a flowchart showing an operation of the imaging apparatus 1B that performs moving image recording processing. It is to be noted that the imaging apparatus 1B executes exposure control of the imaging element 21, control concerned with camera shake blur correction, or the like in parallel with and in addition to the operation shown in FIG. 16.

In a case where the control signal to start video output is input from the host apparatus, the system controller 23B of the imaging apparatus 1B executes control such as the exposure control by the imaging element 21, thereby starting the exposure by the imaging element 21.

In a case of starting the video output, the system controller 23B periodically reads video from the imaging element 21 while continuously executing the exposure by the imaging element 21 (step S51). As described above, in a case where the optical system 11B is the lens constituted of the equidistant projection system, the system controller 23B acquires the image data of the equidistant projection system for one frame from the imaging element 21.

The projection converting section 31B of the system controller 23B performs projection conversion processing of converting the image data of the equidistant projection system which is acquired in the step S51 into the image data of the central projection system (step S52). The projection converting section 31B converts the image data of the equidistant projection system into the image data of the central projection system, for example, by a method similar to the projection conversion processing shown in FIG. 9.

The field angle segmenting section 32B performs the cropping to segment the image data converted into the central projection system by the projection converting section 31B (step S53). The field angle segmenting section 32B sets a segmenting region on the image data converted into the central projection system and performs the cropping in accordance with a field angle to be recorded as an image file.

The video output section 36B adds the synchronous signal to the image data segmented by the field angle segmenting section 32B to output the video signal (step S54).

Furthermore, the system controller 23B judges whether or not to end the video output (step S55). For example, the system controller 23B judges whether or not to end the video output in accordance with the control signal input from the host apparatus. In a case of judging that the video output does not end the step S55, NO), the system controller 23B shifts to the step S51 to perform the video output of the next frame. In a case of judging that the video output ends (the step S55, YES), the system controller 23B ends the video output.

Also according to the above-mentioned constitution, similarly to the first embodiment, the imaging apparatus 1B can adjust a positional relation between the subject image in which the image moving amount of the subject image is uniform to the change of an incidence angle of entering light and the imaging plane of the imaging element 21 to perform the blur correction. As a result, the imaging apparatus 1B can acquire the image data of the central projection system in which the blur correction is appropriately performed along the whole region.

Furthermore, in a case where the detected blur is large in the first embodiment, i.e., a case where an angular velocity detected by the gyrosensor 25 is not less than a preset threshold value, the constitution described in the first embodiment may be combined with a constitution to perform the lens type blur correction described in the third embodiment. Consequently, it is possible to correct the large blur. Furthermore, the constitution described in the first embodiment may be combined with a constitution to perform electronic blur correction described as the second embodiment and the lens type blur correction described as the third embodiment.

Fourth Embodiment

Hereinafter, an example of an imaging apparatus 1C according to a fourth embodiment will be described with reference to FIG. 17 and FIG. 18. It is to be noted that a constitution similar to the imaging apparatus 1 according to the first embodiment is denoted with the same reference signs, and its detailed description is omitted.

Figure 17:
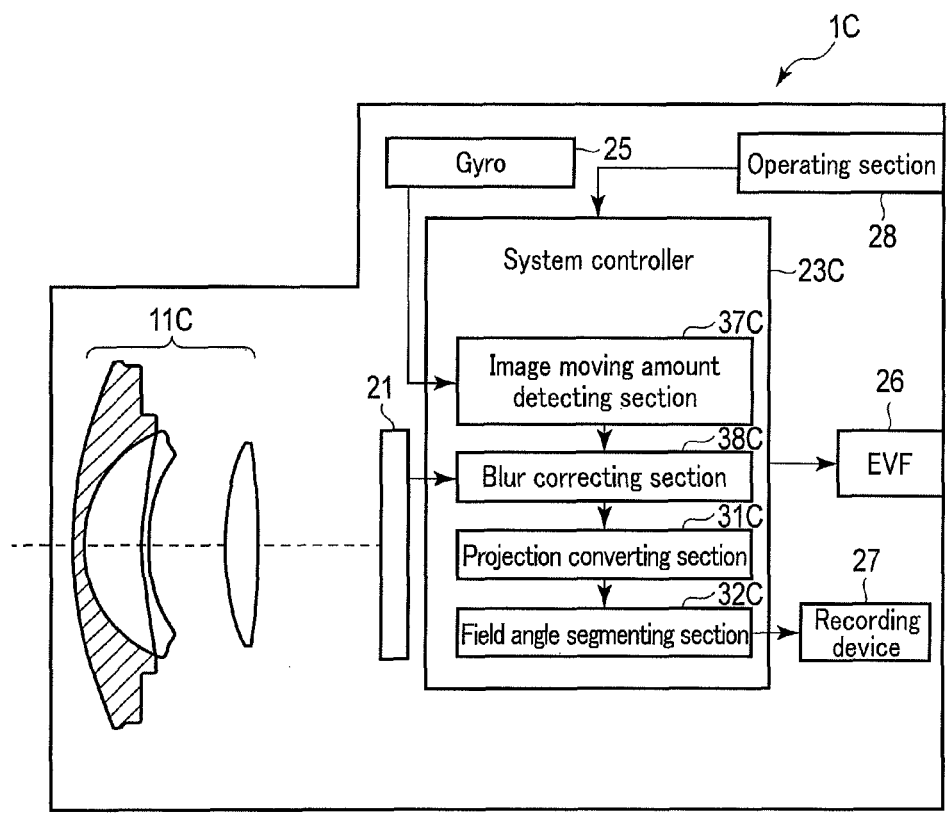
FIG. 17 is a diagram to explain a constitution example of an imaging apparatus according to a fourth embodiment.

FIG. 17 shows the constitution example of the imaging apparatus 1C. The imaging apparatus 1C is a lens-integrated camera that performs electronic blur correction. For example, the imaging apparatus 10 is a so-called action camera that specializes in moving image photography. The imaging apparatus 10 comprises an optical system 11C, an imaging element 21, a system controller 23C, a gyrosensor 25, an EVF 26, a recording device 27, and an operating section 28.

The optical system 11C is an imaging lens of an equidistant projection system. The optical system 11C is different from the optical system 11 in that the system is a single focus lens in which it is not possible to change a focal distance.

The system controller 23C is a controller that includes, for example, a CPU, a memory and the like and controls an operation of the imaging apparatus 1C in the same manner as in the system controller 23. The system controller 23C performs control of exposure by the imaging element 21, reading of image data, and image processing to the read image data. The system controller 23C comprises a projection converting section 31C, a field angle segmenting section 32C, an image moving amount detecting section 37C, and a blur correcting section 38C.

The image moving amount detecting section 37C detects an image moving amount of a subject image on an imaging plane of the imaging element 21 on the basis of an angular velocity signal supplied from the gyrosensor 25, and optical characteristic information indicating a focal distance of the optical system 11C, a projection system of the optical system 11C and the like. For example, the image moving amount detecting section 37C detects the image moving amount of the subject image in a horizontal direction on the imaging plane in accordance with an amount of a rotary motion in a yaw direction which is indicated by the angular velocity signal and in which a vertical direction of the imaging plane of the imaging element 21 is defined as an axis. Furthermore, the image moving amount detecting section 37C detects the image moving amount of the subject image in the vertical direction on the imaging plane in accordance with the amount of the rotary motion in a pitch direction which is indicated by the angular velocity signal and in which the horizontal direction of the imaging plane of the imaging element 21 is defined as an axis. Furthermore, the image moving amount detecting section 37C detects an image rotating amount of the subject image in a roll direction on the imaging plane in accordance with an amount of the rotary motion in the roll direction which is indicated by the angular velocity signal and in which an optical axis of the optical system 11C is defined as an axis.

The blur correcting section 38C sets a region (an effective region) to be left as a file of the image data acquired by the imaging element 21, and segments an image in the effective region as a frame image on the basis of the detected image moving amount and image rotating amount. The frame image is continuously photographed image data, and is an element constituting a moving image. Furthermore, the blur correcting section 38C accumulates and calculates the image moving amounts and image rotating amounts supplied from the image moving amount detecting section 37C from start of exposure, thereby recognizing a shift between a center of a field angle of each frame image and an optical axis center of the optical system 11C.

For example, the blur correcting section 38C rotates the image data on the basis of the image rotating amount of the subject image in the roll direction on the imaging plane which is detected by the image moving amount detecting section 37C. Specifically, the blur correcting section 38C rotates the image data to cancel the image rotating amount of the subject image in the roll direction on the imaging plane which is detected by the image moving amount detecting section 37C. Furthermore, the blur correcting section 38C specifies a position of the center of the field angle in the horizontal direction of the effective region on the rotated image data on the basis of the image moving amount of the subject image in the horizontal direction on the imaging plane which is detected by the image moving amount detecting section 37C. Furthermore, the blur correcting section 38C specifies the position of the center of the field angle in the vertical direction on the rotated image data on the basis of the image moving amount of the subject image in the vertical direction on the imaging plane which is detected by the image moving amount detecting section 37C. The blur correcting section 38C specifies the effective region in which the position specified on the rotated image data is the center of the field angle. The blur correcting section 38C specifies the effective region in which the position specified on the rotated image data is the center of the field angle.

The projection converting section 31C performs projection conversion to convert the projection system of the frame image. In a case of performing projection conversion processing, the projection converting section 31C specifies a position of the optical axis center of the optical system 11C on the frame image, and converts the frame image into the image data of a central projection system based on the specified optical axis center.

The field angle segmenting section 32C performs cropping to segment the image data converted into the central projection system by the projection converting section 31C. The field angle segmenting section 32C specifies an image point corresponding to the center of the field angle of the frame image before performing the projection conversion processing, on the image data converted into the central projection system by the projection converting section 31C. The field angle segmenting section 32C performs the cropping to segment a predetermined field angle based on the specified image point.

Figure 18:
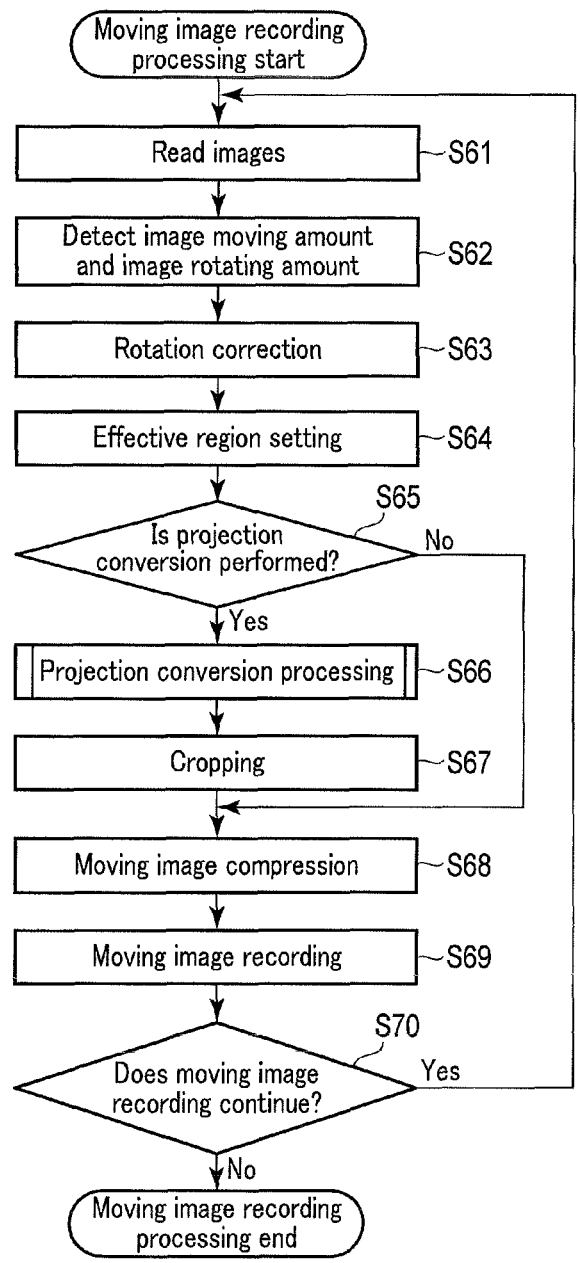
FIG. 18 is a flowchart to explain an example of an operation of the imaging apparatus according to the fourth embodiment.

FIG. 18 is a flowchart showing the operation of the imaging apparatus 10 that performs moving image recording processing. It is to be noted that the imaging apparatus 10 executes exposure control of the imaging element 21, or the like in parallel with and in addition to the operation shown in FIG. 18.

In a case of performing the operation of carrying out the moving image recording processing, the system controller 23C of the imaging apparatus 10 executes control such as the exposure control by the imaging element 21, thereby starting the exposure by the imaging element 21.

In the case of carrying out the moving image recording processing, the system controller 23C periodically reads images from the imaging element 21 while continuously executing the exposure by the imaging element 21 (step S61). As described above, in a case where the optical system 11C is the lens constituted of the equidistant projection system, the system controller 23C aquires the image data of the equidistant projection system for one frame from the imaging element 21.

The image moving amount detecting section 37C of the system controller 23C detects the image moving amount and image rotating amount of the subject image on the basis of the angular velocity signal supplied from the gyrosensor 25 (step S62). For example, the image moving amount detecting section 37C detects the image moving amount of the subject image in the horizontal direction and vertical direction in accordance with the amount of the rotary motion in the yaw direction and pitch direction which is indicated by the angular velocity signal. Furthermore, the image moving amount detecting section 37C detects the image rotating amount of the subject image in the roll direction in accordance with the amount of the rotary motion in the roll direction which is indicated by the angular velocity signal.

The blur correcting section 38C of the system controller 23C rotates the image data on the basis of the image rotating amount extracted in the step S62 (step S63). For example, the blur correcting section 38C rotates the image data to cancel the image rotating amount of the subject image in the roll direction.

The blur correcting section 38C of the system controller 23C specifies the effective region on the image data rotated in the step S63 on the basis of the image moving amount extracted in the step S62 (step S64). The system controller 23C segments the image in the effective region as the frame image.

The system controller 23C judges whether or not to perform the projection conversion processing (step S65). For example, the system controller 23C comprises the memory that stores setting of performing/non-performing of the projection conversion processing by the projection converting section 31C. The system controller 23C may be constituted to judge that the controller performs the projection conversion processing in a case of setting that the projection converting section 31C performs the projection conversion processing with reference to the memory.

In a case of judging in the step S65 that the controller does not perform the projection conversion processing (the step S65, NO), the system controller 23C shifts to processing of step S68 without performing the projection conversion processing.

Furthermore, in a case of judging in the step S65 that the controller performs the projection conversion processing (the step S65, YES), the projection converting section 31C of the system controller 23C performs the projection conversion processing on the basis of the frame image acquired in the step S64 (step S66). In a case of performing the projection conversion processing, the projection converting section 31C specifies the position of the optical axis center of the optical system 11C on the frame image, and converts the frame image into the data of the central projection system based on the specified optical axis center. For example, the projection converting section 31C specifies the position of the optical axis center of the optical system 11C on the frame image on the basis of the shift between the center of the field angle of each frame image and the optical axis center of the optical system 11C which is recognized by the blur correcting section 38C. It is to be noted that the projection conversion processing is similar to the step S45 of FIG. 14, and detailed description is omitted.

The field angle segmenting section 32C performs the cropping to segment the frame image converted into the central projection system by the projection converting section 31C (step S67). The field angle segmenting section 32C specifies the image point corresponding to the center of the field angle of the frame image before performing the projection conversion processing, on the frame image converted into the central projection system. The field angle segmenting section 32C specifies, in accordance with the field angle to be recorded as an image file, a segmenting region on the frame image converted into the central projection system, based on the specified image point. The field angle segmenting section 32C segments the frame image of the central projection system in the segmenting region.

The system controller 23C compresses the segmented frame image into a moving image format (step S68), and records the image data in the recording device 27 (step S69).

Furthermore, the system controller 23C judges whether or not the moving image recording processing continues (step S70). In a case of judging that the moving image recording processing continues (the step S70, YES), the system controller 23C shifts to the step S61 to perform moving image recording processing for the next frame. In a case of judging that the moving image recording processing does not continue (the step S70, NO), the system controller 23C ends the moving image recording processing.

According to the above-mentioned constitution, the imaging apparatus 10 cancels rotation blur in the roll direction in which the optical axis center of the optical system 11C is defined as the axis, and additionally adjusts the positional relation between the subject image and the imaging plane in accordance with the image moving amount, so that it is possible to perform rotation blur correction along a yaw axis, a pitch axis, and a roll axis.

Furthermore, according to the present embodiment, it has been described that the imaging apparatus 10 has a constitution in which the system controller 23C defines the optical axis center of the optical system 11C as the axis to correct the rotation blur in the roll direction by image processing, but the present invention is not limited to this constitution. For example, the imaging apparatus 1C may comprise a rotating mechanism to rotate the imaging plane of the imaging element 21 in the roll direction, and may rotate the imaging plane in the roll direction on the basis of the image rotating amount extracted in the step S62 by the rotating mechanism to correct the rotation blur. It is to be noted that in the rotation blur, the subject image rotates based on the optical axis. Consequently, the imaging apparatus 10 may be constituted to correct the rotation blur by any method, as long as the imaging apparatus performs the rotation blur correction before performing the projection conversion processing of the step S66.

Furthermore, in a case where the blur detected in the first embodiment is large, i.e., a case where an angular velocity detected by the gyrosensor 25 is not less than a preset threshold value, the constitution described in the first embodiment may be combined with a constitution to perform the electronic blur correction described in the fourth embodiment. Consequently, it is possible to correct the larger blur.

It is to be noted that a function described in each of the above-mentioned embodiments is not limited to a function constituted by using hardware, and it is possible to read, by a computer, a program in which each function is described and achieve the program by use of software. Furthermore, each function may be constituted by appropriately selecting one of software and hardware.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. An imaging apparatus comprising:
an imaging element comprising an imaging plane in which pixels to convert light into electric signals are arranged;
a photographing optical system that forms a subject image of equidistant projection on the imaging plane; and
a processor executing instructions to implement:
a blur detecting section that detects an image moving amount of the subject image;
a blur correcting section that adjusts a positional relation between the subject image and the imaging plane on the basis of the image moving amount;
an imaging control section that acquires an equidistant projection image corresponding to the subject image by the imaging element; and
a projection converting section that converts the equidistant projection image into an image of a different system;
wherein the blur correcting section moves the imaging plane on the basis of the image moving amount, and
the projection converting section has an optical axis center converting section that converts a position of an optical axis center of the photographing optical system into a center of a field angle in the equidistant projection image on the basis of a moving amount of the imaging plane, and the projection converting section defines the center of the field angle of the image converted by the optical axis center converting section as an axis to perform central protection generation, thereby converting the equidistant projection image into a central projection image.

2. An imaging apparatus comprising:
an imaging element comprising an imaging plane in which pixels to convert light into electric signals are arranged;
a photographing optical system that forms a subject image of equidistant projection on the imaging plane; and
a processor executing instructions to implement:
an imaging control section that acquires an equidistant projection image corresponding to the subject image by the imaging element;
a blur detecting section that detects an image moving amount of the subject image;
a blur correcting section that specifies an effective region in the equidistant projection image on the basis of the image moving amount;
a projection converting section that converts, into an image of a different projection system, an image corresponding to the effective region of the equidistant projection image which is specified by the blur correcting section;
wherein the blur correcting section moves the effective region on the basis of the image moving amount, and
the projection converting section has an optical axis center converting section that converts a position of an optical axis center of the photographing optical system into a center of a field angle in the equidistant projection image on the basis of a moving amount of the effective region, and the projection converting section defines the optical axis center converted by the optical axis center converting section as an axis to perform conversion into a central projection image.

3. The imaging apparatus according to claim 1,
wherein the projection converting section judges whether or not to convert the equidistant projection image into the image of the different projection system on the basis of optical characteristics of the photographing optical system.

4. The imaging apparatus according to claim 3,
wherein the projection converting section converts the equidistant projection image into the image of the different projection system on the basis of optical characteristics of the photographing optical system, in a case of converting the equidistant projection image into the image of the different projection system.

5. The imaging apparatus according to claim 3,
wherein the photographing optical system comprises a memory that stores optical characteristic information indicating the optical characteristics of the photographing optical system,
the processor executing instructions to further implement:
an acquiring section that acquires the optical characteristic information from the memory of the photographing optical system,
wherein the projection converting section judges whether or not to convert the equidistant projection image into the image of the different projection system on the basis of the optical characteristic information acquired by the acquiring section.

6. The imaging apparatus according to claim 5,
wherein the optical characteristic information includes information to calculate a diagonal field angle of the equidistant projection image, and information to judge the projection system of the photographing optical system.

7. The imaging apparatus according to claim 1,
wherein the blur detecting section further detects an image rotating amount of the subject and
the blur correcting section rotates the imaging plane on the basis of the image rotating amount.

8. The imaging apparatus according to claim 2,
wherein the blur detecting section further detects an image rotating amount of the subject image, and
the blur correcting section rotates the equidistant projection image on the basis of the image rotating amount, and specifies the effective region in the equidistant projection image rotated on the basis of the image moving amount.

9. The imaging apparatus according to claim 2,
wherein the projection converting section judges whether or not to convert the equidistant projection image into the image of the different projection system on the basis of optical characteristics of the photographing optical system.

10. The imaging apparatus according to claim 9,
wherein the projection converting section converts the equidistant projection image into the image of the different projection system on the basis of the optical characteristics of the photographing optical system, in a case of converting the equidistant projection image into the image of the different projection system.

11. The imaging apparatus according to claim 9,
wherein the photographing optical system comprises a memory that stores optical characteristic information indicating the optical characteristics of the photographing optical system,
the processor executing instructions to further implement:
an acquiring section that acquires the optical characteristic information from the memory of the photographing optical system,
wherein the projection converting section judges whether or not to convert the equidistant projection image into the image of the different projection system on the basis of the optical characteristic information acquired by the acquiring section.

12. The imaging apparatus according to claim 11,
wherein the optical characteristic information includes information to calculate a diagonal field angle of the equidistant projection image, and information to judge the projection system of the photographing optical system.

13. An image blur correcting method in an imaging apparatus comprising an imaging element comprising an imaging plane in which pixels to convert light into electric signals are arranged, and a photographing optical system that forms a subject image of equidistant projection on the imaging plane, the method comprising:

detecting an image moving amount of the subject image;
adjusting a positional relation between the subject image and the imaging plane by moving the imaging plane on the basis of the image moving amount;
acquiring an equidistant projection image corresponding to the subject image by the imaging element;
converting a position of an optical axis center of the photographing optical system into a center of a field angle in the equidistant projection image on the basis of a moving amount of the imaging plane; and
defining the center of the field angle of the converted image as an axis to perform central projection generation, thereby converting the equidistant projection image into a central projection image.

14. An image blur correcting method in an imaging apparatus comprising an imaging element including an imaging plane in which pixels to convert light into electric signals are arranged, and a photographing optical system that forms a subject image of equidistant projection on the imaging plane, the method comprising:
acquiring an equidistant projection image corresponding to the subject image of the equidistant projection by the imaging element;
detecting an image moving amount of the subject image;
moving an effective region in the equidistant projection image on the basis of the image moving amount;
converting a position of an optical axis center of the photographing optical system into a center of a field angle in the equidistant projection image on the basis of a moving amount of the effective region; and
defining the converted optical axis center as an axis to perform conversion an image corresponding to the effective region of the equidistant projection image into a central projection image.

15. The image blur correcting method according to claim 13, comprising:
further detecting an image rotating amount of the subject image; and
rotating the imaging plane on the basis of the image rotating amount.

16. The image blur correcting method according to claim 14, comprising:
further detecting an image rotating amount of the subject image; and
rotating the equidistant projection image on the basis of the image rotating amount, and specifying the effective region in the equidistant projection image rotated on the basis of the image moving amount.

* * * * *